United States Patent
Hermus et al.

(10) Patent No.: US 9,571,678 B2
(45) Date of Patent: Feb. 14, 2017

(54) METHOD FOR CREATING A DIGITAL DOCUMENT FROM A HARDCOPY DOCUMENT AND A REPRODUCTION SYSTEM

(71) Applicant: OCE-TECHNOLOGIES B.V., Venlo (NL)

(72) Inventors: Bastiaan J. Hermus, Eindhoven (NL); Eduardus J. W. Van Vliembergen, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/337,018

(22) Filed: Jul. 21, 2014

(65) Prior Publication Data

US 2014/0327939 A1    Nov. 6, 2014

Related U.S. Application Data

(63) Continuation of application No. PCT/EP2013/050257, filed on Jan. 9, 2013.

(30) Foreign Application Priority Data

Jan. 20, 2012    (EP) .................................. 12151881

(51) Int. Cl.
   *H04N 1/00*    (2006.01)
   *H04N 1/46*    (2006.01)
   *H04N 1/40*    (2006.01)

(52) U.S. Cl.
   CPC ........ *H04N 1/0044* (2013.01); *H04N 1/00411* (2013.01); *H04N 1/00442* (2013.01);
   (Continued)

(58) Field of Classification Search
   CPC .............. H04N 1/0044; H04N 1/00411; H04N 1/00442; H04N 1/00485; H04N 1/46; H04N 2201/0082; H04N 2201/0094; H04N 2201/043
   (Continued)

(56) References Cited

U.S. PATENT DOCUMENTS 5,937,232 A    8/1999 Taguchi et al.
7,065,716 B1 *    6/2006 Rzepkowski et al. ........ 715/839
(Continued)

FOREIGN PATENT DOCUMENTS

WO    WO 99/09518    2/1999

*Primary Examiner* — Quang N Vo
(74) *Attorney, Agent, or Firm* — Birch, Stewart, Kolasch & Birch, LLP (57) ABSTRACT

A method for creating digital documents from hardcopy documents by means of a reproduction system including a display and a scanner includes detecting an event of an intended scanning of a hardcopy document; upon detection of the event, opening an image adjustment screen at the display, the screen including an image area, a scan settings area and a process button; displaying at the image area of the screen a digital image; displaying, at the scan settings area of the screen, image parameter values; activating the image parameter values by activating the process button; closing the screen at the display; scanning the hardcopy document according to the image parameter values corresponding with the displayed digital image resulting in a digital document; and selecting the digital image to be displayed to be either equal to a digital image that has been previously stored, or equal to a predetermined other digital image.

11 Claims, 8 Drawing Sheets

(52) U.S. Cl.
CPC ........... *H04N 1/00485* (2013.01); *H04N 1/46* (2013.01); *H04N 2201/0082* (2013.01); *H04N 2201/0094* (2013.01); *H04N 2201/043* (2013.01)

(58) Field of Classification Search
USPC ............ 358/448, 1.15, 474, 1.14, 1.13, 1.16
See application file for complete search history.

(56) References Cited

U.S. PATENT DOCUMENTS

2005/0270601 A1* 12/2005 Rodrigues et al. ........... 358/527
2008/0285092 A1* 11/2008 Curtis .......................... 358/474
2011/0222095 A1* 9/2011 Sheng ......................... 358/1.13

* cited by examiner

METHOD FOR CREATING A DIGITAL DOCUMENT FROM A HARDCOPY DOCUMENT AND A REPRODUCTION SYSTEM

CROSS-REFERENCE TO RELATED APPLICATIONS

This application is a Continuation of International Application No. PCT/EP2013/050257, filed on Jan. 9, 2013, and for which priority is claimed under 35 U.S.C. §120. PCT/EP2013/050257 claims priority under 35 U.S.C. §119(a) to Application No. 12151881.5, filed in Europe on Jan. 20, 2012. The entire contents of each of the above-identified applications are hereby incorporated by reference into the present application.

BACKGROUND OF THE INVENTION

1. Field of the Invention

The present invention relates to a method for creating digital documents from hardcopy documents by means of a reproduction system comprising a display and a scanner, wherein the method comprises the steps of: detecting an event of an intended scanning of a hardcopy document; upon detection of the event, opening an image adjustment screen at the display, said image adjustment screen comprising an image area, a scan settings area and a process button; before scanning of the hardcopy document, displaying a digital image at the image area of the image adjustment screen; displaying image parameter values at the scan settings area of the image adjustment screen; activating the image parameter values by activating the process button; and scanning the hardcopy document according to the image parameter values corresponding with the displayed digital image resulting in a digital document.

The present invention also relates to a reproduction system configured to execute the method according to the present invention.

2. Description of Background Art

Reproduction systems are known to include a scanner to scan hardcopy originals, e.g. paper originals and to create a digital document. Such a scanner may be a color scanner that can be used to produce a color scan of the hardcopy original. A reproduction system including a scanner may also include a print engine in order to print the digital document scanned from the hardcopy originals. The print engine produces a print of the hardcopy originals. Such a reproduction system usually has a local user interface or a remote workstation to be used by an operator or a user. The local user interface or the remote workstation includes a display for displaying image parameter values to be set before scanning of a hardcopy original and a setting device configured to prepare the reproduction system for the reproduction of the hardcopy original, for example for updating the set image parameter values. The display and setting device may be integrated into a touch screen.

A digital image is defined as a product of a scanning action. This product may take the form of a scan file being a number of bits of the digital image residing in a memory of the reproduction system. This scan file may take the form of a print out that is printed by the reproduction system on a receiving material based on the digital image. The digital image may be a colored digital image.

The intention of a user to scan a hardcopy document may be detected by means of a relevant event. Such an event may be opening a lid of a document feeder, putting in a hardcopy original in a document feeder or pushing a copy or scan button. Upon the detection of such an event, preparations may be carried out for the reproduction of the hardcopy original.

A preparing step for the reproduction of the hardcopy original is setting image parameters, for example for tuning of brightness, contrast and colors of the digital image.

When reproducing, e.g. copying or scanning, a hardcopy original, it may be very hard to make a satisfactory digital image, in particular, since no preview is available, because the hardcopy original has not been scanned yet. Reasons for this difficulty may be that the hardcopy original has color or contrast related problems, the scanner perceives the colors of the hardcopy original different from how the user sees them, or the printer has not been calibrated correctly.

Typically the user is offered a way to indicate to the reproduction system how the digital image should look by means of displaying a predetermined digital image at the display, e.g. the operator panel, according to image parameters that are set with initial image parameter values. These image parameters may be visualized with respect to the predetermined image and displayed by the display. The user may change these initial image parameter values in order to change the predetermined digital image into an image that shows the desired output.

However, this is not very helpful if the hardcopy original is not like the predetermined digital image.

SUMMARY OF THE INVENTION

It is an object of the present invention to provide a method that enables the user to produce quickly a qualitatively good digital image from a hardcopy original.

According to the present invention, this object is achieved by the method according to the present invention comprising the further step of selecting the digital image to be displayed to be either equal to a digital image that has been previously stored due to scanning a previous hardcopy document, when predetermined visual presentation criteria are met, or equal to a predetermined other digital image.

A first hardcopy document has been scanned in the past and is shown to the user before scanning a second hardcopy document when predetermined visual presentation criteria are met. By doing so, the visual presentation of the first digital image, which may be already approved by a user, is used for tuning a result of the scanning of the second hardcopy document. This is advantageous, since the user does not have to make an extra scan action as a preview any more, but may look at a previously made digital image originated from a previous scanning action.

According to an embodiment of the present invention the predetermined visual presentation criteria comprise a criterion for a maximum time period between scanning of the hardcopy document and detection of the event. This is advantageous in case the user only wants visual representations of digital images that have been scanned earlier during the current hour, the current day, the current week or another current period of time. This is based on a work scenario of the user who reproduces similar hardcopy documents close together in time.

According to an embodiment of the method, the predetermined visual presentation criteria comprise a criterion that the previously stored digital image has been created during scanning of a hardcopy document just before detecting the event. This is advantageous, since a user who has scanned a hardcopy document just before the scanning of the second hardcopy document may want to have the same kind of output of the second digital document output as the first digital image.

According to an embodiment of the method, the predetermined visual presentation criteria comprise a criterion of displaying a digital image which is created first in time when scanning the previous hardcopy document. This is advantageous because the first created digital image during the scanning of the first hardcopy document may comprise different, more significant information than subsequent created digital images, when the hardcopy document contains a plurality of sheets to be scanned. For example, when a document consists of multiple pages, the page selection may become arbitrary. However, in many cases a first page contains information which is more suitable for adjustment of the image parameters than another page such as a second scanned page or a last scanned page. In mixed color and black-and-white documents the first page is often in color.

According to an embodiment of the method, the hardcopy document is the same as the previous hardcopy document. In that case, the selected visual presentation that corresponds to a first hardcopy original sheet of the previous scanned document, also corresponds to a first hardcopy original sheet of the second hardcopy document. This situation may occur when the user in first instance tries to make a suitable scan during a first scanning action of the first hardcopy original of a first hardcopy document. The reproduction system shows a digital image created during the scan of the first instance. Only when the shown digital image is not according to the wishes of the user, the user may want to scan this first hardcopy document again.

According to an embodiment of the present invention, the method further comprises the steps of identifying a previous user of the previous hardcopy document, and identifying a present user of the present hardcopy document, wherein the predetermined visual presentation criteria comprise a criterion of displaying a digital image that is created when scanning the previous hardcopy document, if the previous user and the present user are the same user. This is advantageous in case it has to be avoided that somebody's scanned document can be seen by anyone else. Moreover, a time-out may be set on showing the scanned image. After the timeout, the display may return to showing a default picture that has been stored at and provided by a controller of the reproduction system.

According to an embodiment of the present invention, the method further comprises the steps of reading out the image parameter values after adaptation by the user at the scan settings area, updating the image parameter values of a visual presentation of the displayed image by means of the read out image parameter values, and displaying the visual presentation at the image area in accordance with the updated image parameter values. Usually, the user makes a first scan without any change from the default image parameter values. When the use of default image parameter values does not lead to satisfactory results, the user may want to edit and update the image parameter values, while the just scanned image is shown and also updated according to the updated image parameter values.

According to an embodiment of the present invention, the method further comprises the step of printing the digital document. Such printing of the digital document may be activated by activation of a copy button at the input of a hardcopy document in a document feeder of the reproduction system.

The invention also comprises a reproduction system configured to execute the method according to the present invention. Such a reproduction system is configured to create digital documents from hardcopy documents and comprises a scanner for scanning a first hardcopy document to create a digital document, a detector for detecting an event of an intended scanning of a hardcopy document, and a display for displaying the digital image selected according to any one of the previous embodiments of the method according to the present invention. The reproduction system comprises a controller configured to read out displayed image parameter values after adaptation by the user and update the image parameter values of the displayed digital image by means of the read out image parameter values in order to show an updated visual presentation at the display before scanning of the hardcopy document.

The reproduction system may also comprise a print engine to print digital documents.

According to an embodiment of the reproduction system, the controller is configured to set a setting for enabling and disabling of showing the visual representation. This is advantageous in environments, like legal offices, where confidentiality is really important. In such an environment, it is possible to disable the preview of the scanned image. In that case, the reproduction system may be configured to never show a scanned image, but always a default picture.

A further embodiment of such a reproduction system based on the previous embodiments of reproduction systems comprises a print engine in order to print digital documents.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements are identified with the same reference numerals throughout the several views.

Figure 1A:
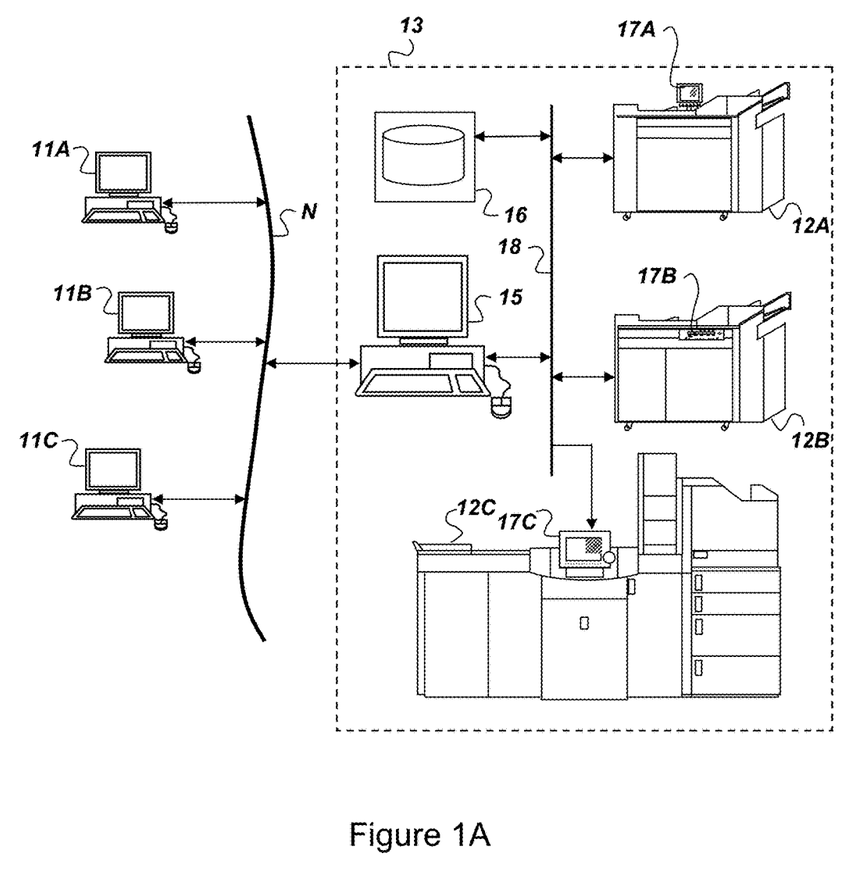
FIG. 1A is a schematic diagram of an environment comprising a plurality of reproduction systems.

FIG. 1A illustrates a general reproduction system including user workstations 11A-11C (e.g., PCs) and a centralized printing facility 13, all connected by a network N such as a Local Area Network, or even the Internet. The centralized printing facility includes a plurality of reproduction apparatuses 12A-12C and a work station 15, which may include a server operating system or a normal operating system for a PC. The centralized printing facility may also include a document database 16 or be connected to a central database facility acting as a document database. The devices in the centralized printing facility are interconnected by a local network 18, which may be part of the general network N.

In operation, users prepare documents on their workstations and submit the resulting document data files to the centralized printing facility for printing and possibly storage in the database 16. The files for printing are received by the server 15 and are, under the control of a user or operator, transferred to a printer device 12A-12C.

The server 15 runs program software and so forms a system for editing and specifying the print processing of the print job that produces the prints according to the document file submitted by the users.

Each reproduction apparatus 12A-12C has a local user interface 17A-17C. A first reproduction apparatus 12A comprises a local user interface 17A mounted on top of the reproduction apparatus 12A. A second reproduction apparatus 12B comprises a local user interface 17B integrated in a front panel of the reproduction apparatus 12B. A third reproduction apparatus 12C comprises a local user interface 17C having a touch screen mounted on top of the reproduction apparatus 12C.

When a print job arrives at the reproduction apparatus 12A-12C and the job is ready to be printed, settings of the print job are displayed on the local user interface 17A-17C. The elucidation hereinafter assumes the settings of the print job to be displayed at the local user interface of the reproduction apparatus. However, embodiments showing the settings of a print job on a work station arranged in the network N, e.g. on a window of a suitable printer driver, are not excluded from the scope of the present invention.

The reproduction apparatus according to the present invention may be an electro-photographical printer, an inkjet printer, or any other kind of reproduction apparatus. An embodiment of the reproduction apparatus uses sheets of receiving material. Another embodiment of the reproduction apparatus uses rolls of receiving material. Receiving material may be paper, textile, metal plates, printed circuit plates, solar cell plates, overhead sheet material, plastic or any other kind of suitable receiving material or substrate. The reproduction apparatus may comprise finishing options. However, finishing options of external finishing equipment may be coupled to the production system to finish a printed job and to deliver the printed job according to the wishes of a sender or a user of the print job.

Figure 1B:
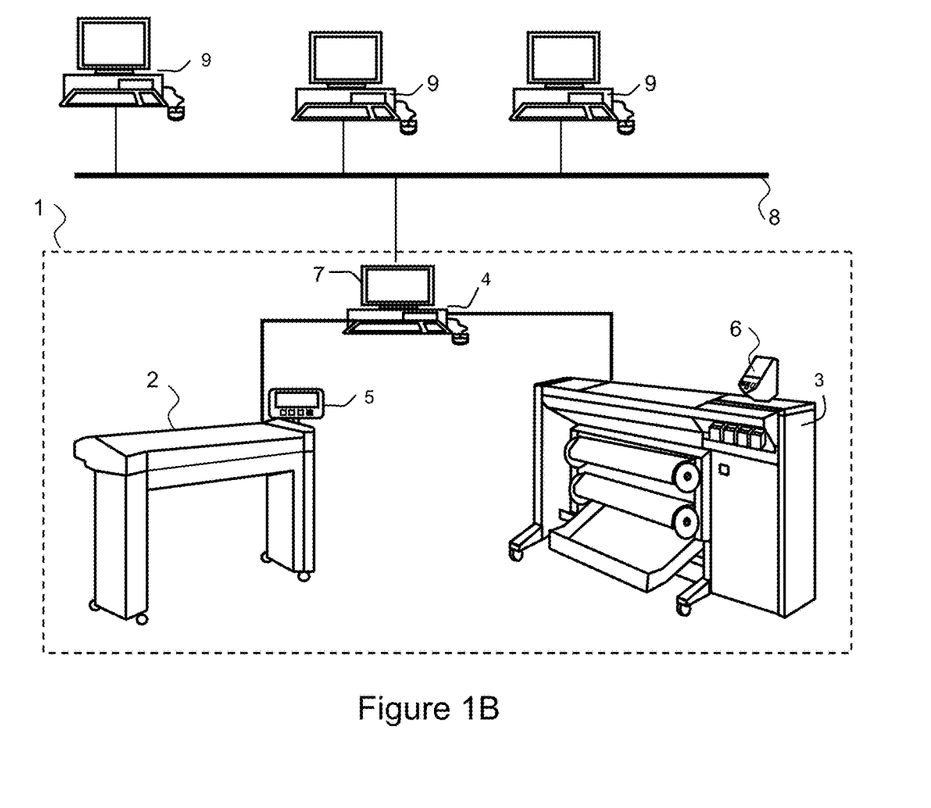
FIG. 1B is a schematic diagram of an environment comprising another reproduction system.

FIG. 1B is a schematic diagram of an environment that comprises a reproduction system 1. The reproduction system 1 as presented here comprises a scanning device 2, a printing device 3 and a control unit 4. The control unit 4 is connected to a network 8 so that a number of client computers 9, also connected to the network 8, may make use of the reproduction system 1. The number of client computers 9 may be provided with printer drivers for the scanning device 2 and the printing device 3. The printer drivers may be used to put settings of a print job or scan job and to dispatch a print job or scan job to the control unit 4.

The scanning device 2 is provided for scanning an image carrying object. The scanning device 2 may be provided with a color image sensor (i.e. a photoelectric conversion device), which converts the reflected light into electric signals corresponding to the primary colors red (R), green (G) and blue (B). The color image sensor may be for example a CCD type sensor or a CMOS type sensor. A local user interface panel 5 is provided for starting scan and copy operations.

The printing unit 3 is provided for printing images on image receiving members. The printing unit may use any kind of printing technique. It may be an inkjet printer, a pen plotter, or a press system based on electro-(photo)graphical technology, for instance. The inkjet printer may be, for example, a thermal inkjet printer, a piezoelectric inkjet printer, a continuous inkjet printer or a metal jet printer. A marking material to be disposed may be a fluid like an ink or a metal, or a toner product. According to FIG. 1B, printing is achieved using a wide format inkjet printer provided with four different basic inks, such as cyan, magenta, yellow and black. The housing contains a print head that is mounted on a carriage for printing swaths of images. The images are printed on an ink receiving medium such as a sheet of paper supplied by a paper roll. A local user interface panel 6 may be provided with an input device such as buttons.

The scanning device 2 and the printing device 3 are both connected to the control unit 4. The control unit 4 executes various tasks such as receiving input data from the scanning device 2, handling and scheduling data files, which are submitted via the network 8, controlling the scanning device 2 and the printing device 3, converting image data into printable data, etc. The control unit 4 is provided with a user interface panel 7 for offering the operator a menu of commands for executing tasks and making settings.

Figure 1C:
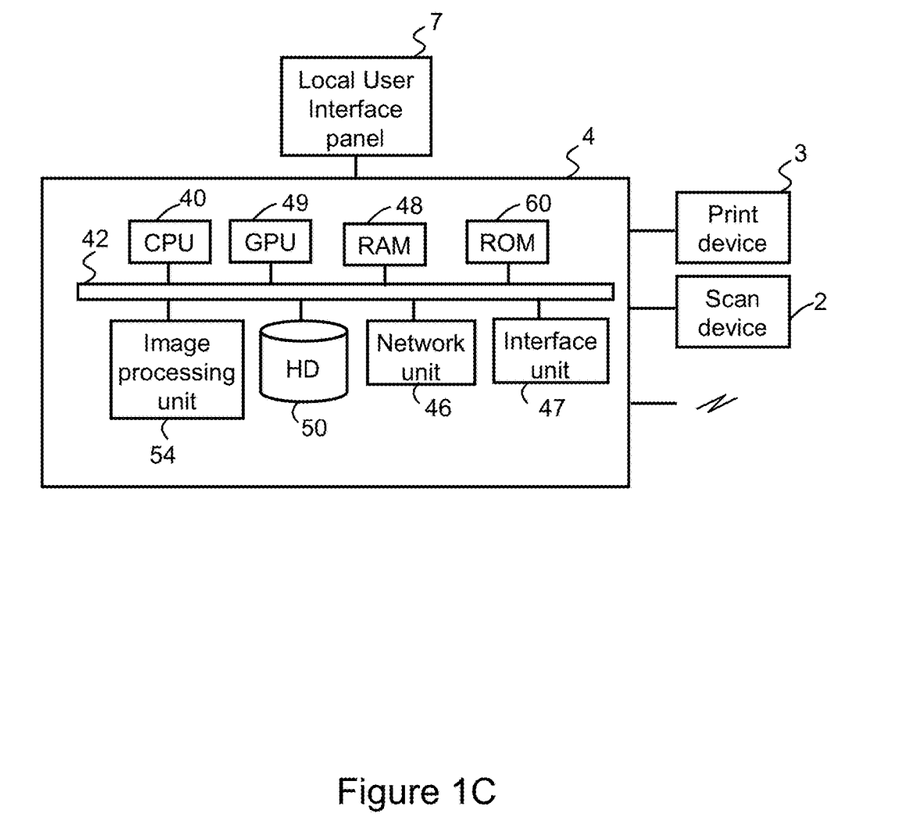
FIG. 1C is a schematic diagram of a control unit of a reproduction system according to FIG. 1A or FIG. 1B.

An embodiment of the control unit 4 is presented in more detail in FIG. 1C. As shown in FIG. 1C, the control unit 4 comprises a Central Processing Unit (CPU) 40, a Graphical Processor Unit (GPU) 49, a Random Access Memory (RAM) 48, a Read Only Memory (ROM) 60, a network unit 46, an interface unit 47, a hard disk (HD) 50 and an image processing unit 54 such as a Raster Image Processor (RIP). The aforementioned units 40, 49, 48, 60, 46, 47, 50, 54 are interconnected through a bus system 42. However, the control unit 4 may also be a distributed control unit.

The CPU 40 controls the respective devices 2, 3 of the control unit 4 in accordance with control programs stored in the ROM 60 or on the HD 50 and the local user interface panel 7. The CPU 40 also controls the image processing unit 54 and the GPU 49.

The ROM 60 stores programs and data such as a boot program, a set-up program, various set-up data or the like, which are to be read out and executed by the CPU 40.

The hard disk 50 is an example of a non-volatile storage unit for storing and saving programs and data that make the CPU 40 execute a print process to be characterized later. The hard disk 50 also comprises an area for saving the data of externally submitted print jobs. The programs and data on the HD 50 are read out from the RAM 48 by the CPU 40 as needed. The RAM 48 has an area for temporarily storing the programs and data read out from the ROM 60 and HD 50 by the CPU 40, and a work area which is used by the CPU 40 to execute various processes. The interface card 47 connects the control unit 4 to scanning device 2 and printing device 3.

The network card 46 connects the control unit 4 to the network 8 and is designed to provide communication with the workstations 9, and with other devices reachable via the network.

The image processing unit 54 may be implemented as a software component running on an operating system of the control unit 4 or as a firmware program, for example embodied in a field-programmable gate array (FPGA) or an application-specific integrated circuit (ASIC). The image processing unit 54 has functions for reading, interpreting and rasterizing the print job data. The print job data contains image data to be printed (i.e. fonts and graphics that characterize the content of the document to be printed, characterized in a Page Description Language or the like), image processing attributes and print settings.

Basic modes of operation for the reproduction system are scanning, copying and printing.

With the electric signals corresponding to the primary colors red (R), green (G) and blue (B) obtained during scanning, a digital image is assembled in the form of a raster image file. A raster image file is generally defined to be an array of regularly sampled values, known as pixels. Each pixel (picture element) has at least one value associated with it, generally specifying a color or a shade of grey which the pixel should be displayed in. For example, the representation of an image may have each pixel specified by three 8 bit (24 bits total) values (ranging from 0-255) defining the amount of R, G, and B respectively in each pixel. In the right proportions, R, G, and B can be combined to form black, white, shades of grey, and an array of colors.

The digital image obtained by the scanning device 2 may be stored on a memory of the control unit 4 and be handled according to a copy path, wherein the image is printed by the print device 3. Alternatively, the digital image may be transferred from the control unit 4 to a client computer 9 (scan-to-file path). A user of the client computer 9 may decide to print a digital image, which reflects the printing mode of operation of the system.

Figure 2:
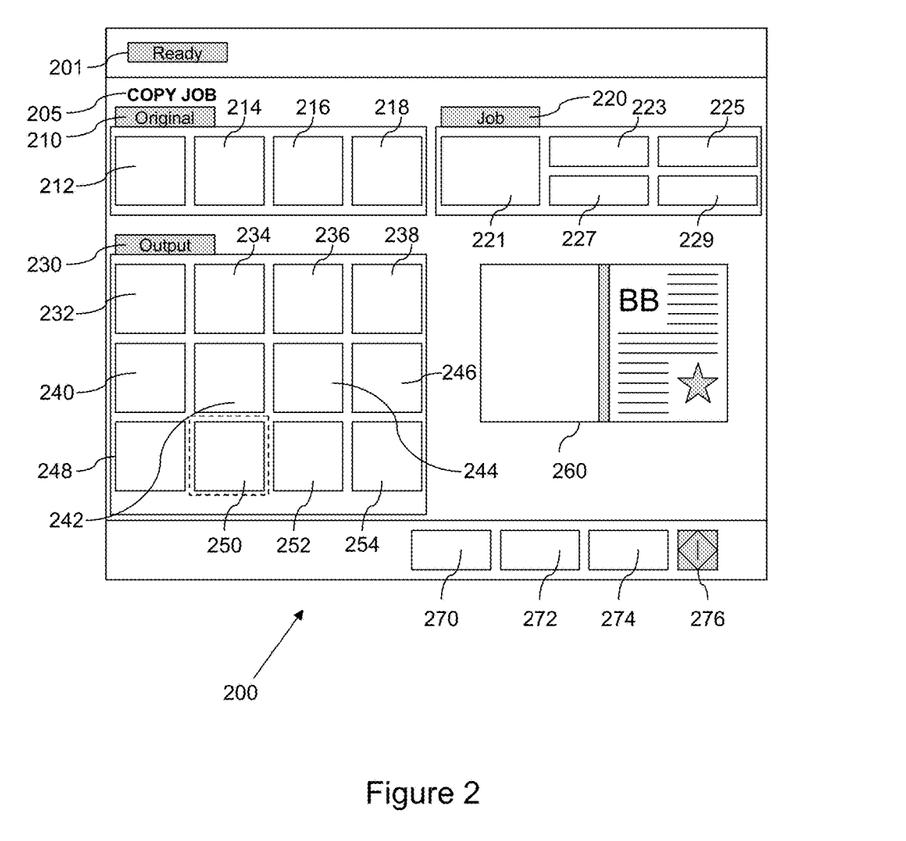
FIG. 2 illustrates a schematic screen to be displayed at the display for editing the parameter values of the scan job or copy job.

FIG. 2 shows a schematic screen 200 to be displayed at the display for editing parameter values of the scan job or copy job or print job.

At the top of the screen 200, a status item 201 is shown for displaying the status of the concerned job. The top of the screen also comprises an indication 205 for distinguishing a copy job, a scan job and a print job.

At the middle of the screen 200, four tile blocks 210, 220, 230, 260 are shown. A first tile block 210 contains parameters tiles 212-218 related to the original in the case of a scan or a copy job. A second tile block 220 contains parameter tiles 221-229 related to the job settings. A third tile block 230 contains parameter tiles 232-254 related to the output of the scan job, copy job or print job. A fourth tile block 260 contains a schematic image of the layout of the document to be scanned, printed or copied in accordance with the parameters set at the item blocks 210, 220, 230.

At the bottom of the screen 200, four buttons 270-276 are respectively shown, a minimize button 272, a cancel button 274, a subsets button 274 and a processing button 276 for starting the job.

The parameters tiles 212-218 of the first tile block 210 are selectable for modifying original parameters and control respectively original parameter values of 1- or 2-sidedness 212, portrait or landscape orientation in combination with a left-right orientation 214, media size 216 and the image type 218 being text, images or a mix of text and images as shown at tile block 260.

The parameters tiles 221-229 of the second tile block 220 are selectable for modifying job parameters and control respectively job parameter values of number of sets 221, job name 223, print delivery 225, destination 227 and account id 229.

The parameters tiles 232-254 of the third tile block 230 are selectable for modifying output parameters and control respectively output parameter values of 1- or 2-sidedness 232, a binding edge 234, media type 236, cover 238, layout 240, zoom 242, align 244, shift 246, margin areas 248, adjust image 250, color or black-and-white 252, binding 254. Even more items may be displayed such as punching, folding and other finishing options.

Figure 3A:
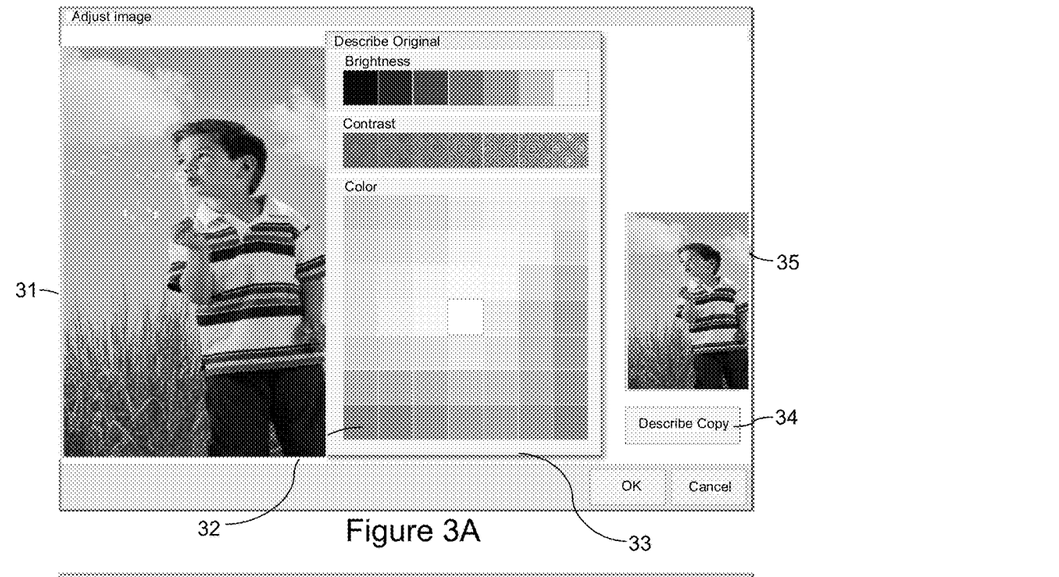
FIGS. 3A-3B schematically illustrates adjust image screens to be displayed at the display according to the present invention for displaying a digital image and adjusting image parameter values in order to adapt the shown digital image.
Figure 3B:
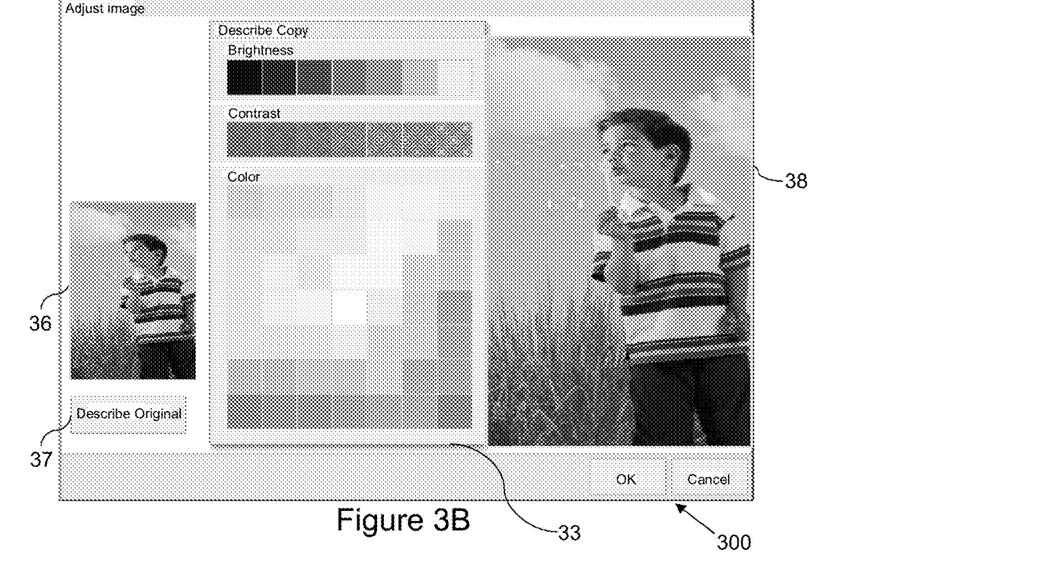

The present invention relates to the parameter tile 250 for adjusting the image. When the adjust image tile 250 is activated by touching, for example, an adjust image screen will appear as shown in FIGS. 3A-3B. Also, when an event indicating that a hardcopy original is going to be scanned or copied is detected, the adjust image screen will pop up. Such event may be opening a lid of a document feeder, putting a hardcopy original in a document feeder or pushing a copy or scan button on a previously displayed screen.

FIG. 3A shows a schematic screen showing a first digital image 31 in order to characterize the hardcopy original (not shown). The first digital image 31 may differ from the hardcopy original to be reproduced. The first digital image 31 has been stored during a previous scan or copy job at a memory of the control unit of the reproduction system. To be able to characterize the hardcopy original, the reproduction system comprises a setting device configured to set image parameters of the hardcopy original. The setting device may be configured in the form of a panel 33 when the display means is a touch screen or is connected to a mouse. The panel 33 contains a row of squares, each of which represents a brightness indicator, a row of squares, each of which represents a contrast indicator, and a matrix of squares 32, each of which represents a different color indicator. The square 32 in the left lower corner of the matrix represents a blue color. The matrix of squares comprising the square 32 in the lower left corner is suitable in combination with a touch screen, since the squares of the matrix may be designed so large as to be uniquely pointed at by a human finger. The color indicators in the squares of the matrix together form a complete discrete color spectrum. Initially, the indicators are set to values in the middle of the rows and the matrix. The user may select a brightness indicator, a contrast indicator by activating a square in each row and a color indicator by activating a square in the matrix.

According to FIG. 3A the panel 33 is to be used to characterize the hardcopy original. The user has to look at his hardcopy original and has to imitate this hardcopy original at his disposition by selecting the resembling brightness indicator, contrast indicator and color indicator from the panel 33. The first digital image 31 will be adapted according to the selected indicators in order to show the user the result of the change of the indicators. Suppose that the hardcopy original is too blue. In that case, the user may select the square 32 in the lower left corner of the matrix and gets the first digital image 31 being more blue-colored and resembling the hardcopy original, which is at his disposition. If the previous scan job or copy job has been executed, for example, with default image parameters, the user may also describe the previous scan or copy in order to correct in advance the outcome of a scan job or copy job of the present hardcopy original if this outcome of the previous scan job or copy job was not according to the user's wishes.

Instead of a matrix of discrete color indicators a square or circle of continuous colors forming the complete color spectrum may be used, which may be activated by clicking by means of a finger, a mouse or any other activating tool.

By the control unit of the reproduction system, the corresponding image parameters set for the reproduction system may be adapted according to the changes made by means of the panel 33. Since we have imitated the hardcopy original instead of the copy image, the selection of the appropriate brightness indicator, the appropriate contrast indicator and the appropriate color indicator by means of the panel 33 results in changes of the image parameter values. The changes of the image parameter values are inverted. This inverse mapping is applied to image parameter values resulting from a scan of the hardcopy original and results in converted image parameter values that are a good starting point for the reproduction of the hardcopy original.

FIG. 3B shows the schematic screen of FIG. 3A again, but now the user is able to adjust the first digital image 36, in FIG. 3B also shown as a second digital image 38 on the right side of the screen in order to characterize the copy image. This schematic screen will be obtained by activating a button 34 below the copy image 35 in FIG. 3A. This schematic screen enables the user to characterize the copy image by changing the brightness, contrast and color in the panel 33. FIG. 3B also shows the first digital image 36 characterizing the hardcopy original.

According to FIG. 3B, the panel 33 is activated for changing the second digital image 38 characterizing the copy image. However, the panel 33 may be activated for changing the first digital image 36 characterizing the hardcopy original by activating a button 37 below the first digital image 36. In this way, a user may toggle between characterizing the hardcopy original and characterizing the copy image.

To show to which image 31, 35, 36, 38 of FIG. 3A-3B the panel 33 is engaged, the engaged image 31, 38 is displayed at a larger size than the non-engaged image 35, 36. For convenience reasons, the actions of characterizing the hardcopy original and characterizing the copy image are combined in one screen. However, embodiments in which each one of these actions is displayed on a separate screen are also part of the present invention. An embodiment in which only the action characterizing the copy image is displayed is also part of the present invention.

The displayed images 31, 35, 36, 38 are selected according to a predetermined visualization criterion. If the visualization criterion is not met, another image may be displayed which is not derived from a previous scan or copy job. Examples of visual presentation criteria will be explained by means of schemes in FIGS. 4-6.

Figure 4A:
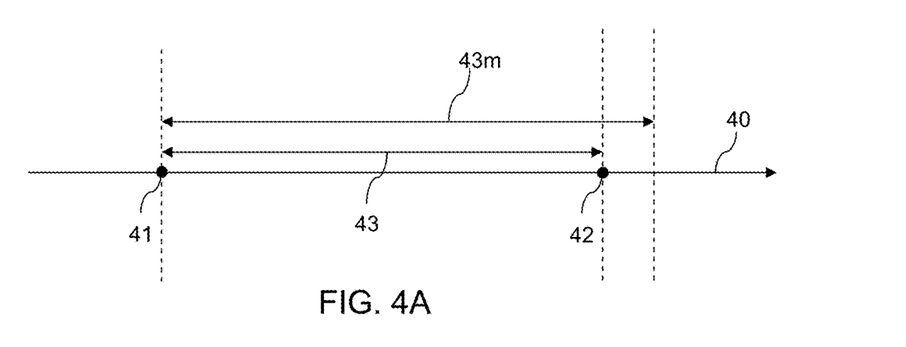
FIGS. 4A-4B schematically illustrate time diagrams according to the method of the present invention comprising a time line of succeeding reproduction jobs.

FIG. 4A shows a schematic diagram according to an embodiment of the method showing a time line 40 of reproduction jobs. At a first moment in time 41, a hardcopy document is scanned at the reproduction apparatus. At a second moment in time 42, the event of an intended scanning of a second hardcopy document is detected. The time period 43 has lapsed between the first moment in time 41 and the second moment in time 42.

According to this embodiment, a visualization criterion is based on a permitted maximum time period 43*m* between the first moment in time 41 of scanning the hardcopy and the second moment in time 42 of the detection of the event. Since the lapsed period 43 is shorter in time than the maximum time period 43*m*, an image resulting from the scanning action at the first moment in time 41 is used for displaying at the image adjusting screen, for example the image adjusting screen 300 in FIG. 3B. Such a permitted maximum time period 43*m* may be configurable in a system setting of the reproduction apparatus, for example 5 minutes. A key operator or service technician of the reproduction apparatus may change this system setting of the maximum time period 43*m*.

Figure 4B:
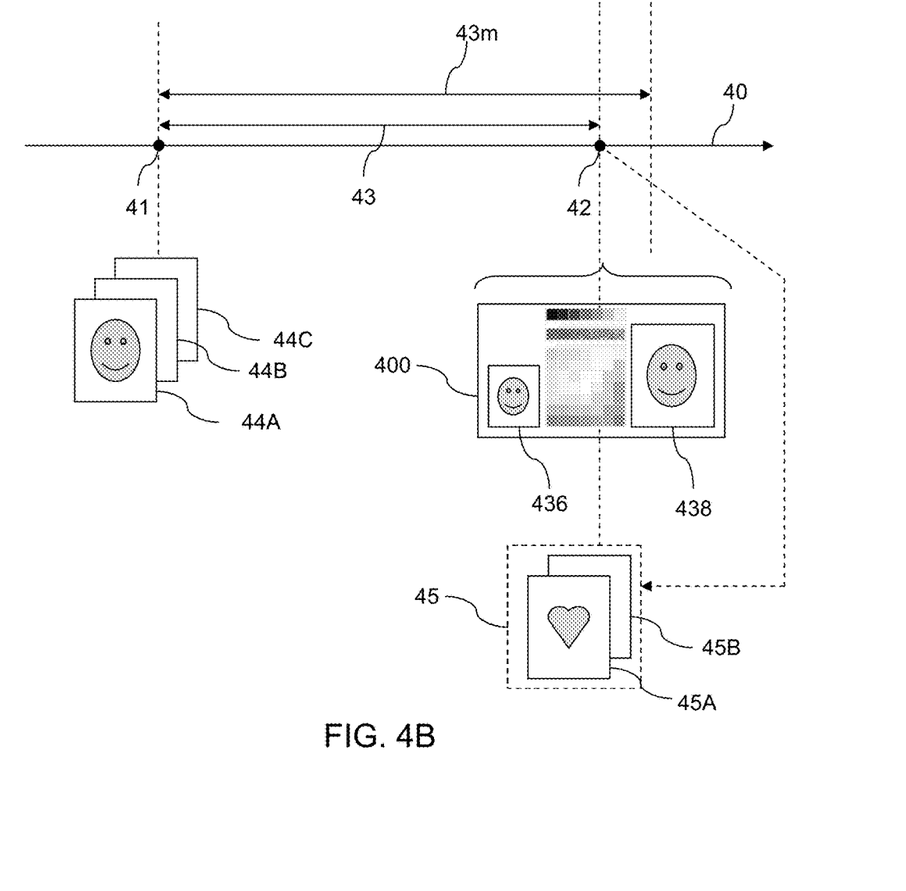

FIG. 4B shows a schematic diagram according to another embodiment of the method again showing the same time line 40 of reproduction jobs. This embodiment may well be combined with the embodiment according to FIG. 4A. At a first moment in time 41, a hardcopy document is scanned at the reproduction apparatus. The hardcopy document consists of a plurality of sheets 44A, 44B, 44C, which are respectively scanned. A first sheet 44A of the hardcopy document is scanned first in time at a time which is approximately equal to the first moment in time 41. At the second moment in time 42, the event of an intended scanning of a second hardcopy document 45 is detected.

According to this embodiment, a visualization criterion is that the first created digital image during the scanning of the hardcopy document is displayed at the adjust image screen 400 at the appropriate screen parts 436 and 438. The first created digital image is, in this example, the image produced by scanning the first sheet 44A. The smiley according to the first sheet 44A is displayed at the adjust image screen 400. After activating the process button at the adjust image screen 400, sheets 45A, 45B of the second hardcopy document 45 are scanned according to the image parameter values corresponding to the displayed image representing the first sheet 44*a* of the already scanned hardcopy document consisting of the sheets 44A, 44B and 44C.

Figure 5A:
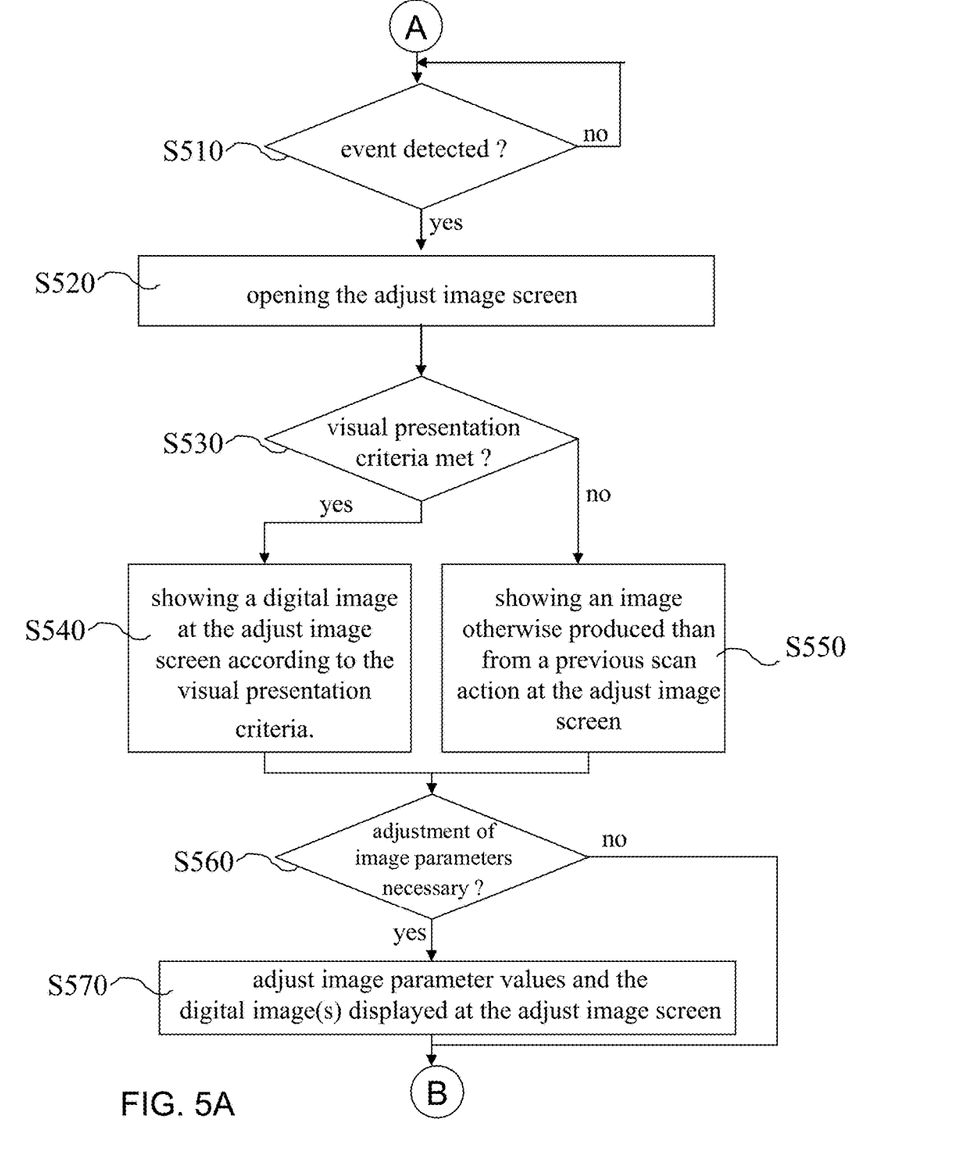
FIGS. 5A-5B is a flow diagram of an embodiment of the method according to the present invention.
Figure 5B:
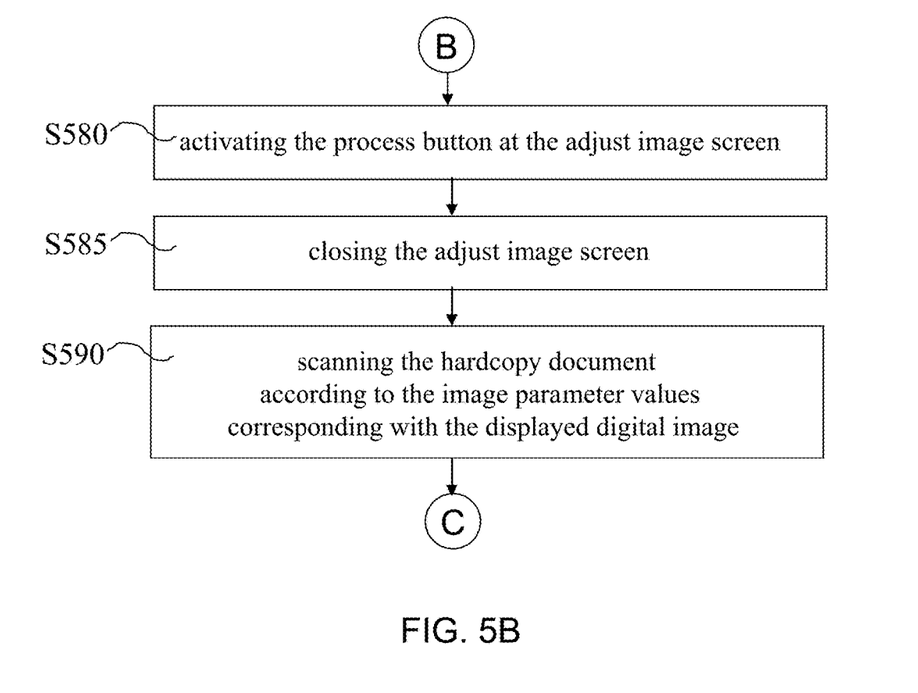

FIGS. 5A-5B show schematically a flow diagram of an embodiment of the method according to the present invention.

At starting point A, a periodic check is executed by the reproduction apparatus in a first step S510. In the first step S510 of the method, it is checked if an event occurs of an intended scanning of a hardcopy document. The detection of such an event may be a result of a signal from a sensor in the reproduction apparatus or a result of activating an appropriate scan or copy button.

In a second step S520, an image adjustment screen is opened when such an event is detected. The image adjustment screen is shown in FIGS. 3A-3B.

In a third step S530, it is checked if the visual presentation criteria are met. The visual presentation criteria may be predetermined or may be set during installation of the reproduction apparatus.

The visual presentation criteria may comprise a criterion for a maximum time period between scanning of the hardcopy document and detection of the event. This is advantageous in case the user only wants visual representations of digital images, which have been scanned earlier during the current hour, the current day, the current week or another current period of time. This is based on a work scenario of the user who reproduces similar hardcopy documents close together in time.

The visual presentation criteria may comprise a criterion that the previously stored digital image has been created during scanning of a hardcopy document just before detecting the event. This is advantageous, since a user who has scanned a hardcopy document just before the scanning of the second hardcopy document may want to have the same kind of output of the second digital document output as the first digital image.

The visual presentation criteria comprise a criterion of displaying a digital image that is created first in time when scanning the previous hardcopy document. This is advantageous because the first created digital image during the scanning of the first hardcopy document may comprise different, more significant information than subsequent created digital images, when the hardcopy document contains a plurality of sheets to be scanned. For example, when a document consists of multiple pages, the page selection may become arbitrary. However, in many cases a first page contains information that is more suitable for adjustment of the image parameters than another page such as a second scanned page or a last scanned page. In mixed color and black-and-white documents the first page is often in color.

In an embodiment of the method, a previous user of the previous hardcopy document is identified and a present user of the present hardcopy document is identified. The visual presentation criteria may then comprise a criterion of displaying a digital image that is created when scanning the previous hardcopy document, if the previous user and the present user are the same user.

If the visual presentation criteria are met, in a fourth step S540, a digital image is shown at the adjust image screen according to the visual presentation criteria. If not, an image otherwise produced than from a previous scan action is shown at the adjust image screen in a fifth step S550.

In a sixth step S560 it is checked if the digital image represents the wishes of the user or that the digital image has to be adapted. In other words, it is checked whether the image parameter values have to be adjusted. If so, a seventh step S570 follows in which the image parameter values are adjusted and adapted digital image(s) are displayed at the adjust image screen. The adjustment of the image parameter values can be obtained by activating the tiles in panel 33 of the image adjust screen according to FIGS. 3A-3B.

A connection point B connects the FIGS. 5A and FIG. 5B.

The next steps S580-S590 are shown from connection point B in FIG. 5B.

In an eight step S580, the user may activate the process button at the adjust image screen.

In a ninth step S585, the adjust image screen may be closed before a tenth step S590. In another embodiment, the adjustment screen is closed after the tenth step S590. In the tenth step S590, the hardcopy document is scanned according to the image parameter values corresponding with the displayed digital image(s) and an end point C of the method is reached.

In a further embodiment, the last step S590 may be followed by a step (not shown) in which the scanned hardcopy document is printed. Naturally, in this embodiment the reproduction apparatus comprises a print engine in order to copy or print digital images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for creating digital documents from hardcopy documents by means of a reproduction system, the reproduction system comprising a display and a scanner, said method comprising the steps of:
    detecting an event of an intended scanning of a current hardcopy document;
    upon detection of the event, opening an image adjustment screen at the display, said image adjustment screen comprising an image area, a scan settings area and a process button;
    before scanning of the current hardcopy document and when predetermined visual presentation criteria are met, displaying, at the image area of the image adjustment screen, a digital image of a previous scanned hardcopy document that is previously scanned, accepted and stored, along with image parameter values at the scan settings area of the image adjustment screen, including a brightness indicator having different brightness levels, a contrast indicator having different contrast levels, and a color indicator having a complete discrete color spectrum, the previous scanned hardcopy document being different from the current hardcopy document;
    adjusting at least one of the image parameters at the scan settings area by at selecting the brightness levels of the brightness indicator, contrast levels of the contrast indicator and/or a discrete color from the color indicator to automatically adjust the digital image displayed at the image area;
    activating the image parameter values by activating the process button; and
    scanning the current hardcopy document according to the at least one adjusted image parameter value corresponding with the displayed digital image, resulting in a digital document corresponding to the current hardcopy document.

2. The method according to claim 1, wherein the predetermined visual presentation criteria comprise a criterion for a maximum time period between scanning of the previous scanned hardcopy document and detection of the event.

3. The method according to claim 1, wherein the predetermined visual presentation criteria comprise a criterion that the previously stored digital image has been created by scanning the previous hardcopy document just before detecting the event.

4. The method according to claim 1, wherein the predetermined visual presentation criteria comprise a criterion of displaying a digital image which is created first in time by scanning the previous hardcopy document.

5. The method according to claim 1 further comprising the steps of:
    identifying a previous user of the previous scanned hardcopy document; and
    identifying a present user of the current hardcopy document,
    wherein the predetermined visual presentation criteria comprise a criterion of displaying a digital image that is created when scanning the previous scanned hardcopy document, if the previous user and the present user are the same user.

6. The method according to claim 1, further comprising the steps of:
    reading out the image parameter values after adaptation by the user at the scan settings area;
    updating the image parameter values of a visual presentation of the displayed image by means of the read out image parameter values; and
    displaying the visual presentation at the image area in accordance with the updated image parameter values.

7. The method according to claim 1, further comprising the step of printing the digital document.

8. A reproduction system configured to execute the method according to claim 1.

9. The reproduction system according to claim 8, further comprising a controller configured to read out displayed image parameter values after adaptation by the user and update the image parameter values of the displayed digital image by the read out image parameter values in order to show an updated visual presentation at the display before scanning of the current hardcopy document.

10. The reproduction system according to claim 9, wherein the controller is configured to set a setting for enabling and disabling of showing the visual presentation.

11. The reproduction system according to claim 8, comprising a print engine to print digital documents.

* * * * *